Aug. 3, 1965   H. SCHLAGETER   3,198,000
DEVICE FOR SUPERVISING THE CONTENT OF GAS IN LIQUID
Filed Nov. 13, 1962   2 Sheets-Sheet 1

INVENTOR.
HORST SCHLAGETER
BY
ATTORNEYS

United States Patent Office 3,198,000
Patented Aug. 3, 1965

3,198,000
DEVICE FOR SUPERVISING THE CONTENT
OF GAS IN LIQUID
Horst Schlageter, Morsch-Karlsruhe, Germany, assignor
to Chlorator G.m.b.H., Groetzingen, Karlsruhe, Germany, a German company
Filed Nov. 13, 1962, Ser. No. 236,927
Claims priority, application Germany, Mar. 23, 1962,
C 26,563
10 Claims. (Cl. 73—19)

The present invention relates to devices for supervising or measuring the content of gas, especially oxygen, in contaminated liquids such as waste water containing sludge.

The operational costs of installations employing activated sludge for the biological purification of waste waters are essentially determined by the energy consumption of the ventilating equipment of the installation. A continuous supervision of the oxygen contents of the activated sludge permits an adjustment of the ventilating equipment of the installation. A continuous supervision of the oxygen contents of the activated sludge permits an adjustment of the ventilating equipment so that the oxygen content is maintained at a level which is just adequate for the required biological activity, or in other words the energy consumption of the ventilating equipment can be set for a minimum.

The continuous supervision of the contents of oxygen or other gases in sludge-containing waste liquids or otherwise heavily contaminated liquids presents considerable difficulties, and no devices are heretofore known that are satisfactory for the purpose.

There are known devices which either measure the magnitude of the diffusion current between polarized electrodes as caused by the oxygen content in the liquid to be supervised, or in which the oxygen is washed out of the liquid by means of an auxiliary gas and is then determined in the auxiliary gas.

All these devices for determining the content of oxygen or other gas in liquids are not capable of reliably and accurately measuring the content of oxygen or other gas in liquids containing sludge and even less in flowable thin sludge.

Electric measurement by means of polarized electrodes operates satisfactorily only when the liquid to be checked does not contain any substances reducible at the measuring electrodes other than oxygen. The molecular oxygen to be measured requires a high negative electrode potential to effect reduction thereof and the oxygen-measuring electrode must be operated just below the hydrogen-separating potential, and there are many substances other than oxygen which are capable of being reduced under such conditions at the oxygen-measuring electrode. Since waste waters tend to have a highly diversified composition there is always a strong possibility that other reducible substances are present in the waste water. Such substances will obviously cause a diffusion current not due to oxygen, thereby correspondingly falsifying the measured data.

Devices based upon washing-out of the oxygen and measuring the oxygen in the gas phase operate satisfactorily only when the impurities in the liquid do not exceed a rather low level. Impurities above that level will affect the efficiency of the gas exchangers of the devices in a short time due to the formation of deposits resulting in a corresponding falsification of the measured data. Furthermore, agitation of the sludge-containing water must be avoided during the measuring operation since otherwise the oxygen content is consumed too rapidly by the oxidizable contents of the sludge and such rapid consumption also causes a falsification of the measurements.

It is a broad object of the invention to provide a novel and improved gas supervising device of the type using the washing out principle in which device a rapid exchange of gas between the liquid phase and the gas phase is effected without danger of clogging or falsified measured data due to the formation of deposits or excessive consumption of gas.

A more specific object of the invention is to provide a novel and improved device of the general kind above referred to in which a continuously renewed liquid film is continually supplied to the gas exchange chamber of the device by means of a rotary probe partly dipping into the liquid to be supervised. This has the advantage that agitation of the liquid to be supervised is held to a minimum, thus reducing the consumption of oxidizable components in the sludge to a minimum. When then the auxiliary gas which is preferably a gas as free of oxygen as possible, such as propane, is conducted through the exchange chamber the oxygen content in the gas phase will reflect the oxygen contained in the liquid with high accuracy. The oxygen in the gas phase can be conveniently determined by any of the measuring means known and suitable for the purpose.

Extensive tests have shown that a device according to the invention permits a highly satisfactory measurement of the gas content in strongly impure and sludge-containing liquids for a practically unlimited period of time since practically no deposits of sludge will form on the surface of the rotary probe, especially if the same is given a smooth or polished surface.

Other and further objects, features and advantages of the invention will be pointed out hereinafter and set forth in the appended claims constituting part of the application.

In the accompanying drawing several preferred embodiments of the invention are shown by illustration and not by way of limitation.

Figure 1:
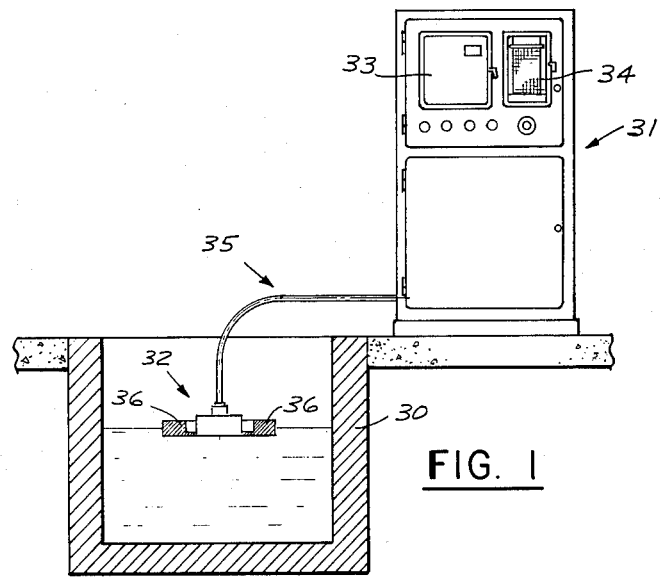
FIG. 1 is a diagrammatic view of an installation including a gas exchange device according to the invention.

Referring now to the figures in detail, FIG. 1 shows a trough 30 along which the liquid to be supervised as to its gas content is flowing. For the purpose of this description it may be assumed that the liquid is waste water containing sludge and that the oxygen content of the water is to be measured continually.

The installation comprises a gas measuring and recording unit 31 and a gas exchange unit 32. The measuring unit is shown as being mounted in a cabinet which should be visualized as containing a suitable oxygen analyzer 33 such as a thermo-magnetic analyzer utilizing the paramagnetic properties of oxygen and a recorder 34. Instead of a recorder a suitable control device can, of course, also be provided. The lower part of the cabinet houses a supply for an auxiliary gas which should be as free of oxygen as possible, such as propane. Fresh auxiliary gas is fed from the supply of gas through conduit means 35 to the exchange device 32 and propane laden with oxygen absorbed from the water in trough 30 is returned through conduit means 35 to the measuring unit in which it is analyzed in analyzer 33. The required valves and control means for controlling the flow of gas to and from device 32 are also housed in the lower part of the cabinet which is separated from the upper part by a gas-tight partition wall. The structure and function of the entire measuring unit 31 do not constitute part of the invention and should be visualized as being conventional.

Figure 2:
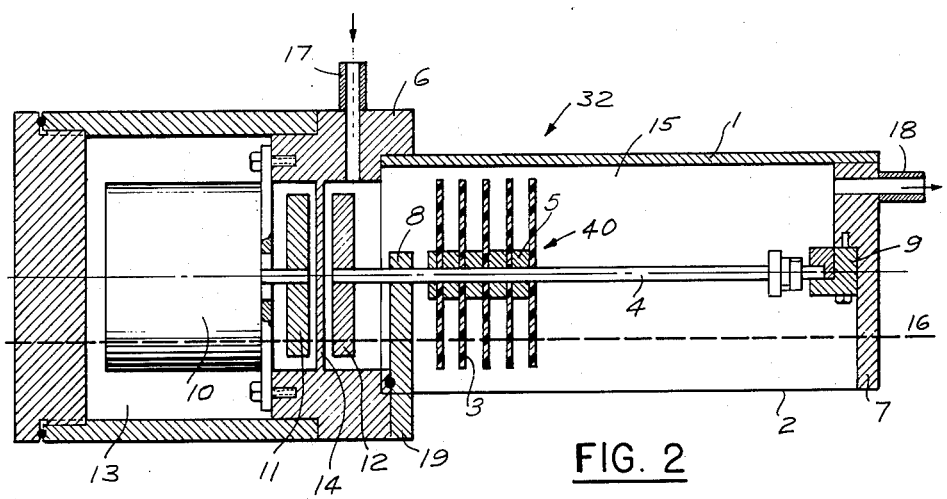
FIG. 2 is a sectional view of an exchange device according to the invention.

The invention resides in the structure of exchange device 32. Referring now to FIG. 2, the exchange device according to this figure comprises a gas exchange chamber 15 formed by a sleeve 1 and end-walls 6 and 7. The chamber has in its bottom an opening 2 for filling the chamber partly with waste water to be supervised. For this purpose the exchange device is floated by means of suitable floats 36 on the waste water, as is shown in FIG. 1. The water level in the chamber is indicated by a dashed line 16.

A probe 40 is rotatably mounted within the chamber. The probe consists basically of a body having smooth surfaces and dipping into the liquid so that a continuous and continually renewed film is formed on the surface portions of the probe as the same emerge from the liquid during the rotation of the probe. A stream of propane is continuously fed through the air space in the chamber above the liquid level by means of inlet and outlet ducts 17 and 18. The flow of propane is supplied from and returned into the measuring cabinet 31 to be analyzed by the analyzer 33 therein, as previously described. The surface of the probe is made as smooth as possible. Plastics such as polyethylene, polytrifluormonochlorethylene or polytetrafluorethylene are suitable for the purpose. Plastics of this kind have a tendency to repel impurities in the liquid, thereby preventing an accumulation of deposits on the surfaces of the probe.

More specifically, probe 40, as shown in FIG. 2, comprises several disks 3 mounted on a preferably horizontal shaft 4 for rotation in unison therewith. The disks are spaced from each other by spacers 5, the distance between the disks being preferably about 1 cm. Shaft 4 is driven by means of an encased motor 10 which is mounted in a closed chamber 13. The drive shaft of the motor is drivingly coupled with shaft 4 by means of a magnetic coupling having two coupling members 11 and 12. Coupling member 11 is secured to the motor shaft and coupling member 12 to shaft 4. The two members are separated from each other by a partition wall 14 which seals chamber 13 from the liquid in the gas exchange chamber 15. Shaft 4 is journaled in a bearing 9 mounted on end wall 7 of chamber 15 and a bearing 8 provided in a wall 19. This wall also serves to prevent access of the liquid in chamber 15 to coupling member 12. The rotational speed of the probe is selected in accordance with the impurity content of the liquid to be supervised. Suitable motor speeds may be between 10 and 150 r.p.m. which can be readily obtained by providing a suitable gearing in the motor. A speed of 120 r.p.m. is often suitable in practice.

Figure 3:
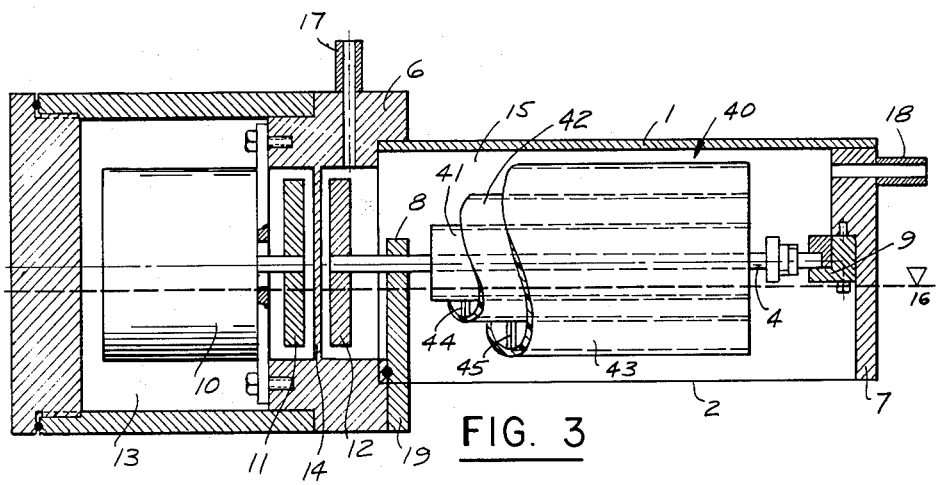
FIG. 3 is a sectional view of a modification of the exchange device.

The device according to FIG. 3 is basically the same as the device shown in FIG. 2, except that the probe shown in FIG. 3 comprises several coaxially disposed and radially spaced hollow cylinders 41, 42 and 43. The cylinders are secured to each other and to shaft 4 by means of suitable spacers such as struts 44 and 45. All three cylinders dip into the water to be supervised as the probe is rotated. As previously explained, the surfaces of the cylinders are coated with a continuous and continually renewed film of liquid, the gas content of which is absorbed by the propane continually passed through gas exchange chamber 15. The cylinders of FIG. 3 should have as smooth a surface as practical and are preferably made of suitable plastics as previously described.

Figure 4:
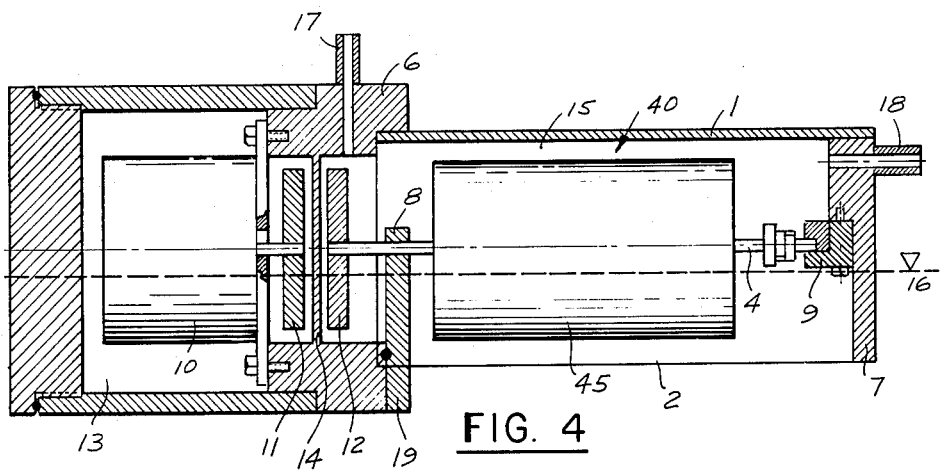
FIG. 4 is a sectional view of still another modification of the exchange device.

The device according to FIG. 4 comprises as a probe a single cylinder 45 fixedly mounted on shaft 4. Cylinder 45 is also preferably made of one of the plastics previously described.

The operation of the probe according to FIG. 4 is evident from the previous description.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for supervising and measuring a gas content in a liquid, in which device a flow of an auxiliary exchange gas is brought into contact with the liquid and the concentration of the gas to be supervised and measured is subsequently determined in said flow of the auxiliary gas by gas analysis, said device comprising gas-analyzing means, and gas exchange means, said exchange means including a closed gas exchange chamber having a bottom opening for partly filling said chamber with the liquid the gas content of which is to be supervised and measured by partly submerging the chamber below the level of said liquid, a rotatable probe mounted in the chamber and partly dipping into the liquid therein when the chamber is partly submerged to form a film of liquid on probe portions above the liquid level, a drive means for rotating said probe, a gas inlet conduit means communicating with the space in said chamber above the liquid level therein when the chamber is partly submerged for directing a flow of auxiliary gas into said space, whereby said auxiliary gas absorbs gas contained in said film of liquid, and a gas outlet conduit means connecting said space with said gas-analyzing means.

2. A device according to claim 1 and comprising a floatable body including said gas chamber.

3. A device according to claim 1 wherein said probe has a rotationally symmetric configuration.

4. A device according to claim 1 wherein said probe is made of a plastic and has only plane and rounded surfaces, all the surfaces of the probe being smooth to impede the formation of deposits thereon.

5. A device according to claim 1 wherein said probe comprises a rotary cylinder mounted on a shaft having a substantially horizontally disposed rotational axis.

6. A device according to claim 1 wherein said probe comprises several hollow coaxially disposed and radially spaced cylinders mounted on a shaft rotatable about a substantially horizontal axis.

7. A device according to claim 1 wherein said probe comprises a substantially horizontally disposed rotary shaft and several disks having smooth surfaces fixedly mounted on said shaft in axially spaced relationship.

8. A device according to claim 1 wherein said probe comprises a smooth body fixedly secured on a shaft rotatably mounted in said chamber, and wherein said drive means comprises an electric motor and a magnetic coupling coupling the motor drive shaft to said probe shaft, said coupling having one coupling member disposed in said closed gas exchange chamber and a second coupling member disposed outside said chamber in magnetically coacting relationship with said one coupling member.

9. A device according to claim 8 wherein a partition wall in said chamber prevents access of liquid to said one coupling member.

10. A device for supervising and measuring the oxygen content in a flow of contaminated water containing suspended matter, in which device a flow of an auxiliary exchange gas is brought into contact with said water and the oxygen concentration in said exchange gas is subsequently determined by gas analysis, said device comprising a gas-analyzing means, and a gas exchange means, said exchange means including a closed gas exchange chamber having a bottom opening for partly filling said chamber with contaminated water by partly submerging said chamber into said flow of water, a rotary shaft, several circular smooth-surfaced disks fixedly mounted on said shaft in lengthwise spaced relationship for rotation of the disks within said chamber, drive means for rotating said shaft and the disks thereon, said chamber having an inlet port located near one end thereof and an outlet port located near the opposite end thereof, first conduit means for conducting a flow of auxiliary exchange gas to said inlet port, second conduit means for conducting said flow after passing through said chamber from said outlet port to said gas-analyzing means, said disks dipping into said water when said chamber is partly submerged into the flow of water and transporting, while being rotated, a film of said water into the space of said chamber above the liquid level therein to form a continuously renewing exchange surface exposed to the flow of said auxiliary exchange gas, and sealing means sealing said drive means against the access of said contaminated water.

References Cited by the Examiner

UNITED STATES PATENTS

| | | | |
|---|---|---|---|
| 1,838,009 | 12/31 | Strecker | 261—92 |
| 2,178,869 | 11/39 | Coons | 261—92 |
| 2,356,784 | 8/44 | Graham | 310—104 |
| 2,678,810 | 5/54 | Chandler | 261—92 |
| 2,698,287 | 12/54 | Bowden et al. | 261—92 |

HARRY B. THORNTON, *Primary Examiner.*

RONALD R. WEAVER, *Examiner.*